US010438243B1

(12) United States Patent
Hapgood et al.

(10) Patent No.: US 10,438,243 B1
(45) Date of Patent: Oct. 8, 2019

(54) METHODS, SYSTEMS, AND MEDIA FOR DYNAMICALLY DETECTING MOBILE ENVIRONMENT INFORMATION

(71) Applicant: Integral Ad Science, Inc., New York, NY (US)

(72) Inventors: Daniel Hapgood, Cornwall (GB); Philip Harris, Somerset (GB); Neil Thorne, Newton Abbot (GB); Jason Cooper, London (GB)

(73) Assignee: Integral Ad Science, Inc., New York, NY (US)

( * ) Notice: Subject to any disclaimer, the term of this patent is extended or adjusted under 35 U.S.C. 154(b) by 55 days.

(21) Appl. No.: 14/978,625

(22) Filed: Dec. 22, 2015

(51) Int. Cl.
*G06Q 30/00* (2012.01)
*G06Q 30/02* (2012.01)
(Continued)

(52) U.S. Cl.
CPC ........... *G06Q 30/0267* (2013.01); *G06F 8/70* (2013.01); *G06F 16/93* (2019.01);
(Continued)

(58) Field of Classification Search
CPC .................................................. G06Q 30/0267
(Continued)

(56) References Cited

U.S. PATENT DOCUMENTS 8,887,178 B1 * 11/2014 Browne .................. G06F 9/541
719/319
9,301,173 B2 * 3/2016 Papakostas ........... H04W 24/08
(Continued)

OTHER PUBLICATIONS

What is Thought, Eric Baum, The MIT Press, 2004, pp. 33-65.*
(Continued)

*Primary Examiner* — Matthew T Sittner
*Assistant Examiner* — Michael I Ezewoko
(74) *Attorney, Agent, or Firm* — Byrne Poh LLP (57) ABSTRACT

Methods, systems, and media for dynamically detecting mobile environment information are provided. In some implementations, a method for detecting mobile environment information for advertisement requests, the method comprising: receiving a request for advertising content from an advertisement tag; applying one or more JavaScript objects to return a URL of an advertisement web view, wherein the advertisement website is generated by an advertisement software development kit to contain an advertisement responsive to the request; extracting keywords from the URL of the advertisement web view; determining whether the advertisement tag is running within a mobile application based on a comparison of the extracted keywords with known mobile application information; in response to determining that the advertisement tag is running within the mobile application, determining the advertisement software development kit from a plurality of advertisement software development kits that the advertisement tag is running in by: applying a plurality of JavaScript objects that are made available by the advertisement software development kit to return properties of the advertisement software development kit; and comparing the returned properties with a database of known software development kit information; and transmitting an indication that associates the advertisement software development kit used within a mobile application environment with the advertisement tag.

18 Claims, 4 Drawing Sheets

(51) Int. Cl.
*G06F 8/70* (2018.01)
*G06F 16/93* (2019.01)
*G06F 16/958* (2019.01)
*G06F 16/955* (2019.01)
*G06F 16/957* (2019.01)

(52) U.S. Cl.
CPC ...... *G06F 16/9566* (2019.01); *G06F 16/9577* (2019.01); *G06F 16/972* (2019.01); *G06F 16/986* (2019.01)

(58) Field of Classification Search
USPC .................................................. 705/14.6
See application file for complete search history.

(56) References Cited

U.S. PATENT DOCUMENTS

| | | | | |
|---|---|---|---|---|
| 9,436,580 | B2* | 9/2016 | Manion | G06F 8/65 |
| 2012/0130801 | A1* | 5/2012 | Baranov | G06Q 30/03 |
| | | | | 705/14.43 |
| 2015/0286737 | A1* | 10/2015 | Cattone | G06F 3/04842 |
| | | | | 715/234 |
| 2016/0055542 | A1* | 2/2016 | Hui | G06Q 30/0269 |
| | | | | 705/14.66 |

OTHER PUBLICATIONS

Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*
Computing the Mind, Shimon Edelman, Oxford University Press, 2008, pp. 26-31.*
Noetics, Lawrence Krader, 2010, Peter Lang Publishing, pp. 551-553.*
Britannica Concise Encyclopedia, Encyclopedia Britannica, 2006, p. 537.*
Explaining Creativity, Keith Sawyer, 2006, Oxford University Press, pp. 104-105.*
Cognition—From Memory to Creativity, Weisberg, Reeves, 2013, John Wiley & Sons, pp. 519-527.*
The Way We Think, Fauconnier, 2010, Persues Books Group, Chapter 1, Chapter 13.*
Microsoft Computer Dictionary, Fifth Edition, 2002, Microsoft Press, p. 23.*
Mind—A Brief Introduction, John R. Searle, 2004, Oxford University Press, pp. 62-67.*

* cited by examiner

METHODS, SYSTEMS, AND MEDIA FOR DYNAMICALLY DETECTING MOBILE ENVIRONMENT INFORMATION

TECHNICAL FIELD

The disclosed subject matter relates to dynamically detecting mobile environment information. More particularly, the disclosed subject matter relates to distinguishing between advertisement requests or other traffic from mobile software applications and advertisement requests or other traffic from mobile web browsing applications.

BACKGROUND

Online advertisements are created with the goal of having the advertisements viewed, listened to, or otherwise received by a target audience. The target audience may be, for example, one or more users with a set of particular interests or one or more users falling into a particular demographic or psychographic group. However, distributing such advertisements to the desired audience is a difficult process. It is often difficult for brand managers, ad networks, publishers, advertisers, and/or advertising agencies (collectively referred to herein as "advertisers") to control and manage the service of their advertisements.

For example, online advertisements allow the publishers of well-viewed websites to derive a profit from their web traffic. To do this, these website publishers can place an advertisement tag on their webpages, which causes the webpage to load additional content that is delivered by an advertisement network. Such an advertisement tag includes an advertisement as well as code that records or otherwise detects the viewer's interaction with a particular webpage. In return, the website publisher can be compensated by the advertisement network as viewers view the advertisement and/or interact with the advertisement.

With the advent of mobile devices, such as smartphones and tablet computing devices, a unique media environment for reaching viewers has been created. As such, rich media display advertising in mobile software applications and from mobile web browsing applications has become increasingly popular. For example, in some cases, advertisements are requested from a mobile web browsing application in response to the mobile web browsing application user accessing a web page. In another example, mobile application developers frequently incorporate functionality into their applications that allows such advertisements to be served within the mobile software application to the application users.

As advertising budgets shift to accommodate the rapid growth of mobile advertising, there is a requirement for advertisers, such as brand managers and advertising agencies, to monitor and verify the amount that has been spent in this mobile environment. This, however, has proved to be a difficult task as mobile software applications present unique challenges with regard to verification. Thus, there is therefore a need in the art for approaches for distinguishing between advertisement requests or other traffic from mobile software applications and advertisement requests or other traffic from mobile web browsing applications.

Accordingly, it is desirable to provide methods, systems, and media that overcome these and other deficiencies in the prior art.

SUMMARY

In accordance with some embodiments of the disclosed subject matter, mechanisms for dynamically detecting mobile environment information are provided.

In accordance with some embodiments of the disclosed subject matter, a method for detecting mobile environment information for advertisement requests is provided, the method comprising: receiving a request for advertising content from an advertisement tag; applying one or more JavaScript objects to return a URL of an advertisement web view, wherein the advertisement website is generated by an advertisement software development kit to contain an advertisement responsive to the request; extracting keywords from the URL of the advertisement web view; determining whether the advertisement tag is running within a mobile application based on a comparison of the extracted keywords with known mobile application information; in response to determining that the advertisement tag is running within the mobile application, determining the advertisement software development kit from a plurality of advertisement software development kits that the advertisement tag is running in by: applying a plurality of JavaScript objects that are made available by the advertisement software development kit to return properties of the advertisement software development kit; and comparing the returned properties with a database of known software development kit information; and transmitting an indication that associates the advertisement software development kit used within a mobile application environment with the advertisement tag.

In some embodiments, the method further comprises adjusting an advertisement budget for advertisements presented within mobile applications based on the transmitted indication.

In some embodiments, the determining the advertisement software development kit from the plurality of advertisement software development kits that the advertisement tag is running further comprises: applying a JavaScript object that returns a string of a user agent header transmitted in the request to an advertisement server; and comparing at least a portion of the string of the user agent header with values stored in a database of known software development kit information.

In some embodiments, the determining the advertisement software development kit from the plurality of advertisement software development kits that the advertisement tag is running further comprises: identifying HTML elements that have been injected in the advertisement web view by the advertisement software development kit; and comparing at least a portion of the identified HTML elements with document properties stored in a database of known software development kit information.

In some embodiments, the method further comprises continuing to apply the plurality of JavaScript objects until a threshold confidence value has been met.

In some embodiments, the method further comprises: extracting property information using the plurality of JavaScript objects; transmitting a query that includes the extracted property information to a database of known software development kit information; and receiving a response to the query that includes one or more software development kits that match the extracted property information.

In accordance with some embodiments of the disclosed subject matter, a system for detecting mobile environment information for advertisement requests is provided, the system comprising: a hardware processor that is configured to: receive a request for advertising content from an advertisement tag; apply one or more JavaScript objects to return a URL of an advertisement web view, wherein the advertisement website is generated by an advertisement software development kit to contain an advertisement responsive to the request; extract keywords from the URL of the advertisement web view; determine whether the advertisement tag is running within a mobile application based on a comparison of the extracted keywords with known mobile application information; in response to determining that the advertisement tag is running within the mobile application, determine the advertisement software development kit from a plurality of advertisement software development kits that the advertisement tag is running in by: applying a plurality of JavaScript objects that are made available by the advertisement software development kit to return properties of the advertisement software development kit; and comparing the returned properties with a database of known software development kit information; and transmit an indication that associates the advertisement software development kit used within a mobile application environment with the advertisement tag.

In accordance with some embodiments of the disclosed subject matter, a non-transitory computer-readable medium containing computer executable instructions that, when executed by a processor, cause the processor to perform a method for detecting mobile environment information for advertisement requests is provided, the method comprising: receiving a request for advertising content from an advertisement tag; applying one or more JavaScript objects to return a URL of an advertisement web view, wherein the advertisement website is generated by an advertisement software development kit to contain an advertisement responsive to the request; extracting keywords from the URL of the advertisement web view; determining whether the advertisement tag is running within a mobile application based on a comparison of the extracted keywords with known mobile application information; in response to determining that the advertisement tag is running within the mobile application, determining the advertisement software development kit from a plurality of advertisement software development kits that the advertisement tag is running in by: applying a plurality of JavaScript objects that are made available by the advertisement software development kit to return properties of the advertisement software development kit; and comparing the returned properties with a database of known software development kit information; and transmitting an indication that associates the advertisement software development kit used within a mobile application environment with the advertisement tag.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some embodiments of the disclosed subject matter, mechanisms (which can include methods, systems, and media) for dynamically detecting mobile environment information are provided.

In some embodiments, mobile advertising activity can include advertisements served from a mobile version of a website or versions of advertisements specifically designed to be served to a mobile device or in a mobile web environment. For example, a mobile web browsing application executing on a mobile device can visit a publisher website and, in response to visiting the publisher website, the mobile web browsing application can send an advertisement tag, which may contain information about the advertisement placement on the page and/or information about the application user, to request for an advertisement from an advertisement server. The resulting advertisement can be transmitted to the mobile web browsing application, which may include uniform resource locator (URL) that identifies the location of the advertisement (e.g., a creative hosted on a content server). This can be, for example, an advertisement-sized iframe running within a webpage.

Additionally or alternatively, mobile advertising activity can include advertisements that are presented in mobile applications executing on a mobile device as the mobile application user uses the mobile application. As such, the mobile application executing on the mobile device can send a request for an advertisement to be served in the mobile application. It should be noted that, because the mobile application in which the creative or advertisement is being display is generally not running JavaScript and/or HTML5 and is instead running the native code of the operating system of the mobile device, the advertisement is presented in a container called a web view, which is an advertisement-sized web page running JavaScript and/or HTML5 (sometimes referred to herein as an "advertisement web view"). This is shown, for example, in FIG. 1 in which an illustrative advertisement web view has been created by the mobile advertising vendor SDK to contain an advertising creative, such as a banner advertisement.

It should also be noted that the advertisement requesting functionality can be provided by a software development kit (SDK) that the developer of the mobile application can integrate into the mobile application. The SDK can include a code library including an application programming interface that allows the mobile application to communicate with an advertisement server or any other suitable advertisement platform to request and receive advertisements in the mobile application.

Figure 1:
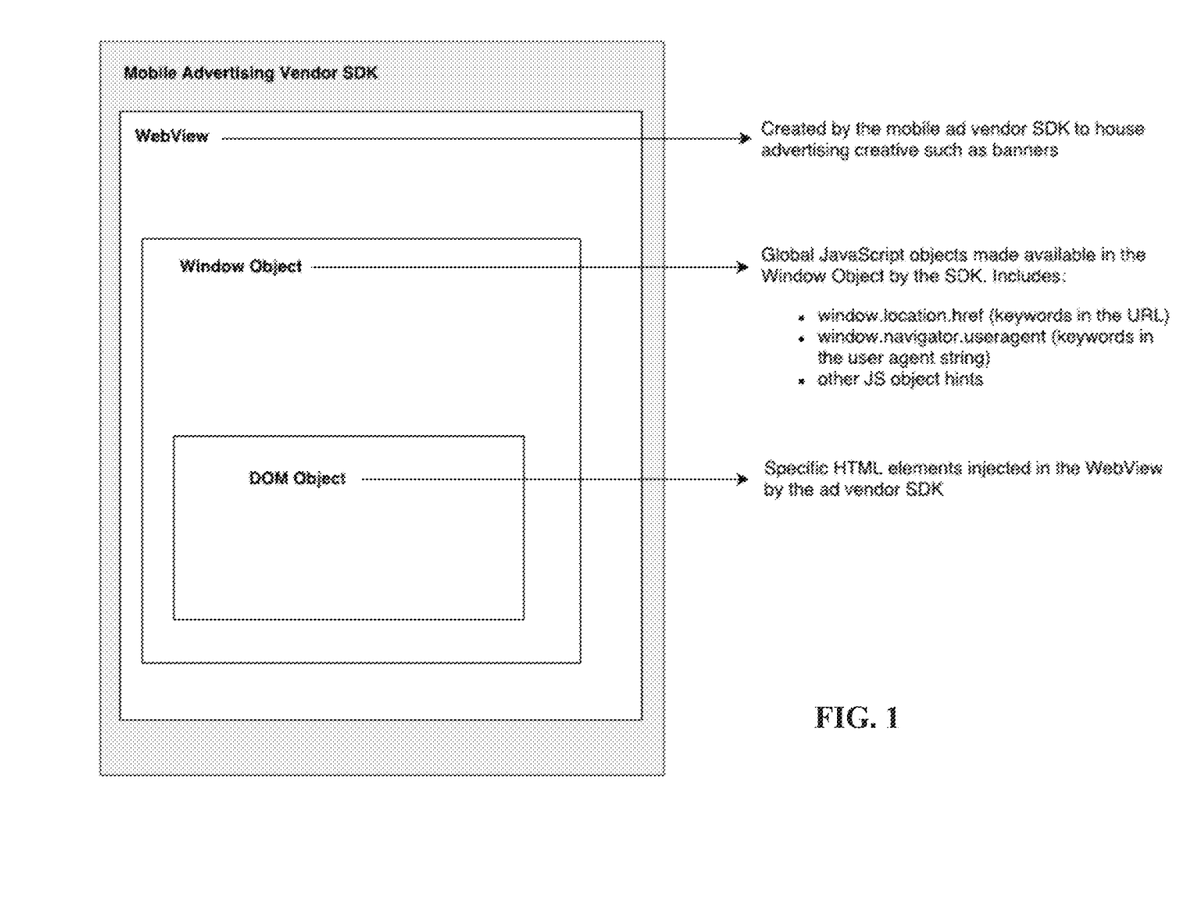
FIG. 1 shows an illustrative example of an advertisement web view generated by a mobile advertising vendor software development kit that contains an advertisement and associated objects in accordance with some embodiments of the disclosed subject matter.

Generally speaking, in order to determine whether the advertisement tag is running within a mobile software application environment, the mechanisms can analyze information extracted from portions of the SDK. For example, as shown in FIG. 1, the mechanisms can analyze extracted information from the advertisement web view created by the mobile advertisement vendor SDK to contain the advertisement (e.g., a banner advertisement). In another example, as also shown in FIG. 1, the mechanisms can analyze extracted information from global JavaScript objects that can be made available in the Window Object by the SDK. In yet another example, as also shown in FIG. 1, the mechanisms can analyze extracted information from specific elements injected into the advertisement web view by, for example, the advertisement vendor SDK, such as one or more HTML document object model (DOM) objects. It should be noted that any suitable information can be extracted from the advertisement web view or the one or more objects within the advertisement web view. It should also be noted that any suitable combination of information can be extracted from the advertisement web view and/or the one or more objects within the advertisement web view. It should further be noted that, in some embodiments, information can continued to be extracted and analyzed from the advertisement web view and/or the one or more objects within the advertisement web view until a determination as to whether the advertisement tag is executing within a mobile web browsing application or a mobile software application can be made.

These mechanisms can be used in a variety of applications. For example, in response to receiving an indication as to the mobile operating environment associated with the advertisement tag, applications that are monitoring advertisement spent can aggregate such mobile environment information over a particular period of time and can determine whether advertisement budgets are appropriately allocated. In another example, in response to receiving an indication as to the mobile operating environment associated with the advertisement tag, applications that are generating and/or determining viewability information can take into account such mobile environment information. In yet another example, applications that intercept advertisement requests and supplement the advertisement requests with additional information, such as device information, placement information, viewability information, and/or other suitable information or statistics, can supplement the advertisement requests with mobile environment information.

These and other features for dynamically detecting mobile environment information are described further in connection with FIGS. 1-4.

Figure 2:
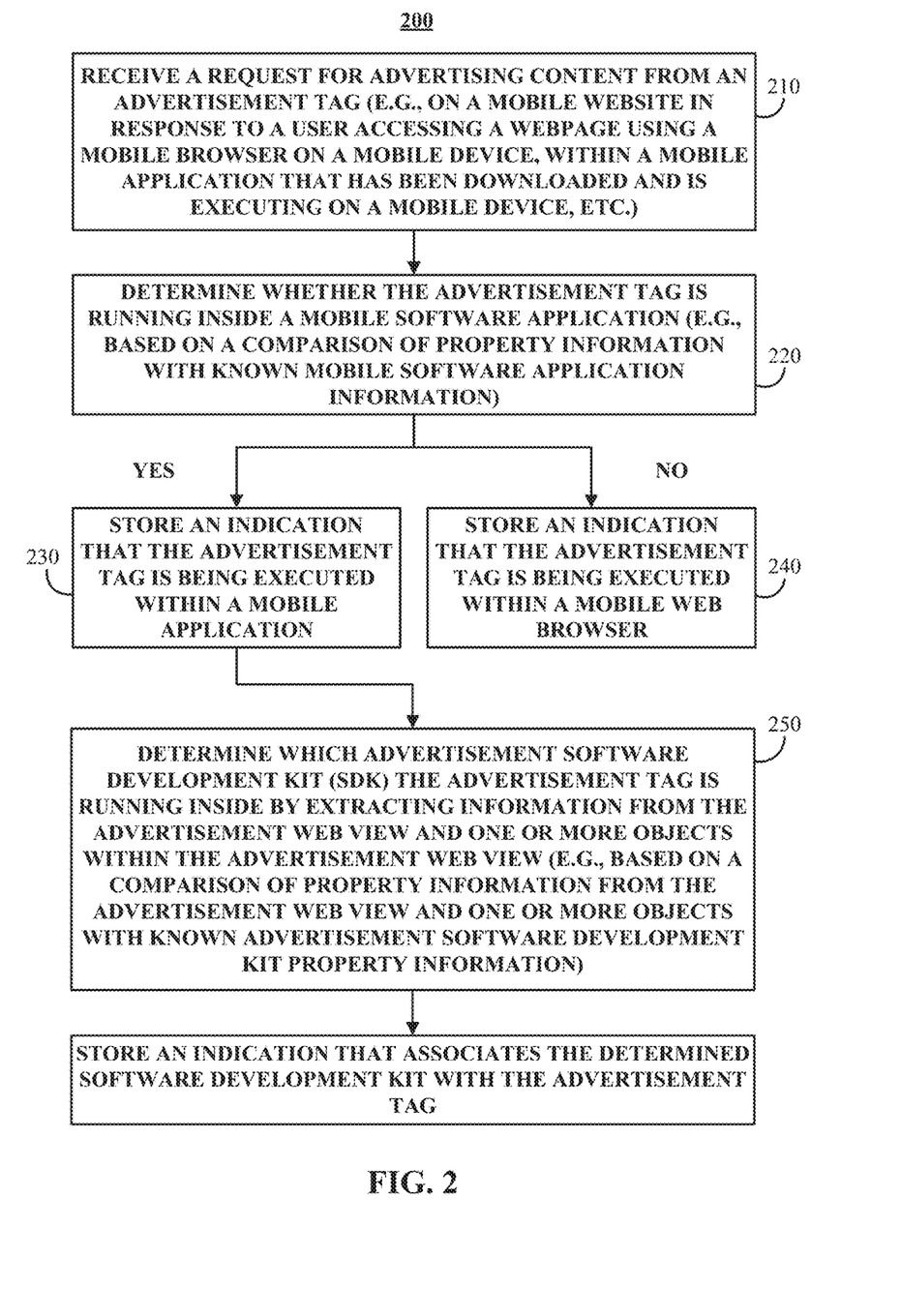
FIG. 2 shows an illustrative example of a process for dynamically detecting mobile environment information in accordance with some embodiments of the disclosed subject matter.

Turning to FIG. 2, an example 200 of an illustrative process for detecting whether an advertisement request is received from a mobile software application or a mobile web browser application is shown in accordance with some embodiments of the disclosed subject matter.

Figure 3:
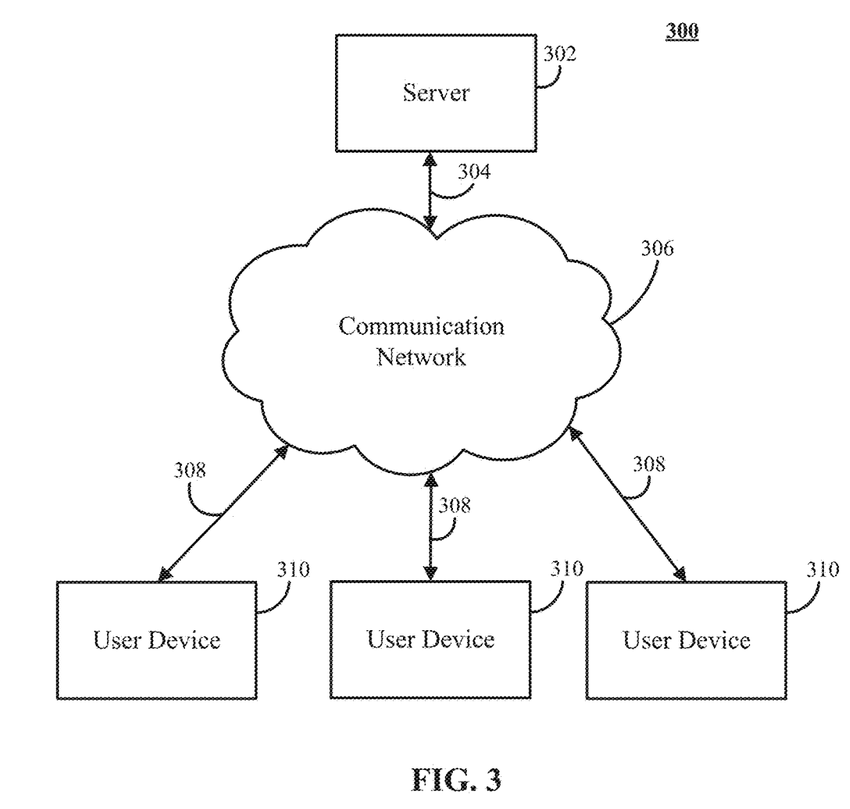
FIG. 3 shows an example of a generalized schematic diagram of a system on which the mechanisms for dynamically detecting mobile environment information as described herein can be implemented in accordance with some embodiments of the disclosed subject matter.

At 210, process 200 can begin by receiving a request for advertising content from an advertisement tag on a website. In some embodiments, this request can be received by any suitable device or combination of devices. For example, as shown in FIG. 3, the request can be received by server 302, or by a user device 310. As another example, the request can be received by an advertiser's server device (e.g., a server that provides advertising content). As yet another example, the request can be received by a third party server device (e.g., an intermediary server that handles a request for advertising content by redirecting the request for advertising content).

In a more particular example, a mobile web browsing application executing on a mobile device can visit a publisher website and, in response to visiting the publisher website, the mobile web browsing application can send an advertisement tag, which may contain information about the advertisement placement on the page and/or information about the application user, to request for an advertisement from an advertisement server. The resulting advertisement can be transmitted to the mobile web browsing application, which may include uniform resource locator (URL) that identifies the location of the advertisement (e.g., a creative hosted on a content server). This can be, for example, an advertisement-sized iframe running within a webpage.

In some embodiments, the request can include any suitable information. For example, in some embodiments, the request can include information for selecting an advertisement. In a more particular example, the request can include information about the website, about the size of an area on the website for the advertisement, about the computing device from which the request originated, and/or any other suitable information. In another more particular example, in connection with the use of an intermediary server, the request can be supplemented with additional information relating to the device transmitting the request, a user account associated with the device, webpage information, publisher information, historical information, etc.

In another more particular example, a mobile software application executing on the mobile device can send a request for an advertisement to be served in the mobile software application. As mentioned above, because the mobile software application in which the creative or advertisement is being display is generally not running JavaScript and/or HTML5 and is instead running the native code of the operating system of the mobile device, the advertisement can be presented in a container called an advertisement web view. This is shown, for example, in FIG. 1 in which an illustrative advertisement web view has been created by the mobile advertising vendor SDK to contain an advertising creative, such as a banner advertisement.

In some embodiments, process 200 for dynamically detecting mobile environment information (e.g., mobile application environment versus mobile web browsing environment) can include determining whether the advertisement tag is running inside a mobile software application using various techniques on object and/or property information at 220. For example, a URL detection technique can be applied that extracts keywords from the URL of the advertisement web view to determine whether the advertisement tag is running inside a mobile software application. In a more particular example, as shown in FIG. 1, process 200 can use global JavaScript objects that are made available in the Window Object by the SDK, such as the JavaScript Window Location object (window.location.href), to return the URL of the advertisement web view and, in response to extracting keywords from the URL of the advertisement web view, process 200 can determine whether the advertisement tag is running inside a mobile software application (e.g., the keyword "applewebdata://" can indicate that the advertisement tag is running within a mobile software application associated with a software developer for Apple platforms). In continuing this example, process 200 can transmit a query that includes the extracted URL keywords to a database containing mobile software application information (e.g., information on mobile applications that are available for download and/or purchase from an online marketplace), where the response to the query includes an identification of one or more mobile software applications corresponding to the extract URL keywords. The identification can include mobile application identification information, mobile application developer information, and/or an indicator that the advertisement request is received from a mobile software application (e.g., as opposed to a mobile web browser).

In response to determining that the advertisement tag is being executed within a mobile software application, for example, upon applying the URL detection technique, process 200 can store an indication that the advertisement tag is being executed within a mobile software application at 230.

Otherwise, in response to determining that the advertisement tag is received from a mobile web browsing application, process 200 can store an indication that the advertisement tag is being executed within a mobile web browsing application at 240. These indications can, for example, be used to provide advertisers with a signal of how much advertisement traffic is originating from particular mobile environments. These indications can also, for example, be used to assists advertisers in determining whether advertisement budgets associated with different mobile environments are appropriately allocated based on how much advertisement traffic is coming from mobile web browsing applications and from within mobile software applications.

In some embodiments, process 200 for dynamically detecting mobile environment information (e.g., mobile application environment versus mobile web browsing environment) can include determining the SDK that the advertisement tag is running inside using various techniques on object and/or property information at 250. As described above, advertisement requesting functionality can be provided by a software development kit or SDK that the developer of the mobile software application can integrate into the mobile software application. The SDK can include a code library including an application programming interface that allows the mobile software application to communicate with an advertisement server or any other suitable advertisement platform to request and receive advertisements in the mobile software application. Process 200 can use various techniques to extract information from the advertisement web view and/or objects associated with the advertisement web view, where the extract information can be analyzed to determine which particular SDK the advertisement tag is running inside.

In some embodiments, process 200 can apply a combination of techniques with the advertisement web view to determine the SDK that the advertisement tag is running inside.

For example, as described above, process 200 can apply a URL detection technique that extracts keywords from the URL of the advertisement web view to determine the SDK that the advertisement tag is running in. In a more particular example, process 200 can review extracted keywords from the URL of the advertisement web view to determine the particular advertisement SDK. In continuing this example, process 200 can transmit a query that includes the extracted keywords to a database containing SDK-related information, where the response to the query can include the identification of one or more advertisement SDKs that meet the criteria of the query—e.g., advertisement SDKs that generate advertisement web views with URL information meeting the query criteria.

In another example, process 200 can apply a JavaScript detection technique that scans JavaScript objects made available in the Window Object by the advertisement SDK to determine the SDK that the advertisement tag is running in. In a more particular example, as shown in FIG. 1, process 200 can scan through one or more global JavaScript objects to determine whether a known set of publicly available properties have been exposed by the advertisement SDK. In another more particular example, process 200 can extract property information from one or more global JavaScript objects made available in the Window Object by the advertisement SDK. In continuing this example, process 200 can transmit a query that includes the extracted information to a database containing SDK-related information, where the response to the query can include the identification of one or more advertisements SDKs that generate JavaScript objects having particular properties. Alternatively to transmitting a search query to a database containing SDK-related information, process 200 can analyze the extracted property information based on known property information from advertisement SDKs. For example, process 200 can determine whether a JavaScript object with the name "AFMA_AddEventListener" exists within the extracted property information. In another example, process 200 can determine whether the extracted property information indicates that multiple JavaScript objects have a name that includes a particular set of characters, such as AFMA.

In yet another example, process 200 can apply a user agent detection technique that extracts keywords in the advertisement web view user agent string made available by the advertisement SDK to determine the SDK that the advertisement tag is running in. This can be made available, for example, using the window.navigator.useragent JavaScript object shown in FIG. 1. In a more particular example, process 200 can use global JavaScript objects that are made available in the Window Object by the advertisement SDK, such as the JavaScript object window.navigator.useragent, to return the value of the user agent header sent to the server. Keywords from the user agent string can be extracted. Based on the extracted keywords from the user agent string, process 200 can determine the particular advertisement SDK that the advertisement tag is running in. For example, process 200 can transmit a query that includes the extracted keywords from the user agent string to a database containing SDK-related information, where the response to the query can include the identification of one or more advertisements SDKs that generate JavaScript objects having particular properties. In a more particular example, the database can include SDK-related information such that a particular advertisement SDK includes user agent strings with the characters "afma-sdk." As such, the presence of such characters are used to identify the use of the particular advertisement SDK. Alternatively to transmitting a search query to a database containing SDK-related information, process 200 can analyze the extracted keywords based on known property information from advertisement SDKs. For example, process 200 can determine whether the user agent string contains the characters "afma-sdk."

In yet another example, an HTML Document Object Manager (DOM) technique can be applied that searches for particular HTML elements specific to an advertisement SDK to determine the advertisement SDK that the advertisement tag is running in. In a more particular example, process 200 can conduct a search for HTML documents or elements injected in the advertisement web view by the advertisement SDK. In continuing this example, by analyzing particular document properties, such as document.URL which returns the full URL of the HTML document and document.scripts which returns a collection of <script> elements in the document, process 200 can determine whether the advertisement SDK has injected a <script> HTML element with a specific URL. For example, for a given set of advertisement SDKs, process 200 can have a set of HTML DOM object hints for each advertisement SDK (e.g., one particular advertisement SDK typically injects a <script> HTML element with a specific URL) and can determine which advertisement SDK the advertisement tag is likely running in based on the extracted document properties.

It should be noted that any suitable combination of the mobile environment detection techniques described above can be used to determine the advertisement SDK that the advertisement tag is running in. In some embodiments, a first technique can be applied and subsequent techniques can continue to be applied until process 200 can determine, with a particular confidence value (e.g., greater than a confidence threshold of 90%), that the advertisement tag is running within a particular advertisement SDK. In some embodiments, a particular sequence of the mobile environment detection techniques can be applied until the particular advertisement SDK has been determined.

In some embodiments, additionally or alternatively to analyzing each advertisement tag, the advertisement request information received from a particular device can be aggregated for a particular time period. One or more of the mobile environment detection techniques described above can be used to determine the advertisement SDK that the advertisement tag is running in. For advertisement tags from a particular device that are identified as being received from a mobile software application, the aggregated information can be used to determine which advertisement SDK that the advertisement tags are running in. In response, each of the advertisement tags can be associated with the particular advertisement SDK.

Referring back to FIG. 2, in response to determining the particular advertisement SDK that the advertisement tag is running in, process 200 can store an indication that associates the determined software development kit with the advertisement tag. In some embodiments, the indication can include additional information, such as advertisement placement information, device information, developer information, etc.

FIG. 3 shows an example 300 of a generalized schematic diagram of a system on which the mechanisms for dynamically detecting mobile environment information as described herein can be implemented in accordance with some embodiments of the disclosed subject matter. As illustrated, system 100 can include one or more user devices 310. User devices 310 can be local to each other or remote from each other. User devices 310 can be connected by one or more communications links 308 to a communication network 306 that can be linked to a server 302 via a communications link 304.

System 300 can include one or more servers 302. Server 302 can be any suitable server or servers for providing access to the mechanisms described herein for dynamically detecting mobile environment information, such as a processor, a computer, a data processing device, or any suitable combination of such devices. For example, the mechanisms for dynamically detecting mobile environment information can be distributed into multiple backend components and multiple frontend components and/or user interfaces. In a more particular example, backend components, such as mechanisms for receiving information related to one or more advertising placements, parsing the information related to one or more advertising placements, receiving and analyzing advertisement web view and associated object information from an advertisement tag executing within an advertisement SDK, determining whether the advertisement tag is running inside a mobile software application or a mobile web browsing application, determining which advertisement SDK the advertisement tag is running in, etc., can be performed on one or more servers 302. In another more particular example, frontend components, such as presentation of a user interface for placing advertisement tags on a given webpage, initiating the mechanisms for dynamically detecting mobile environment information in connection with advertisements, receiving user input, etc., can be performed on one or more user devices 310.

In some embodiments, each of user devices 310, and server 302 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 310 can be implemented as a personal computer, a laptop computer, a smartphone, a tablet computer, a mobile telephone, a wearable computer, any other suitable computing device, or any suitable combination thereof.

Communications network 306 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 304 and 308 can be any communications links suitable for communicating data among user devices 310 and server 302, such as network links, dial-up links, wireless links, hard-wired links, any other suitable communications links, or any suitable combination of such links. Note that, in some embodiments, multiple servers 302 can be used to provide access to different mechanisms associated with the mechanisms described herein for dynamically detecting mobile environment information.

Figure 4:
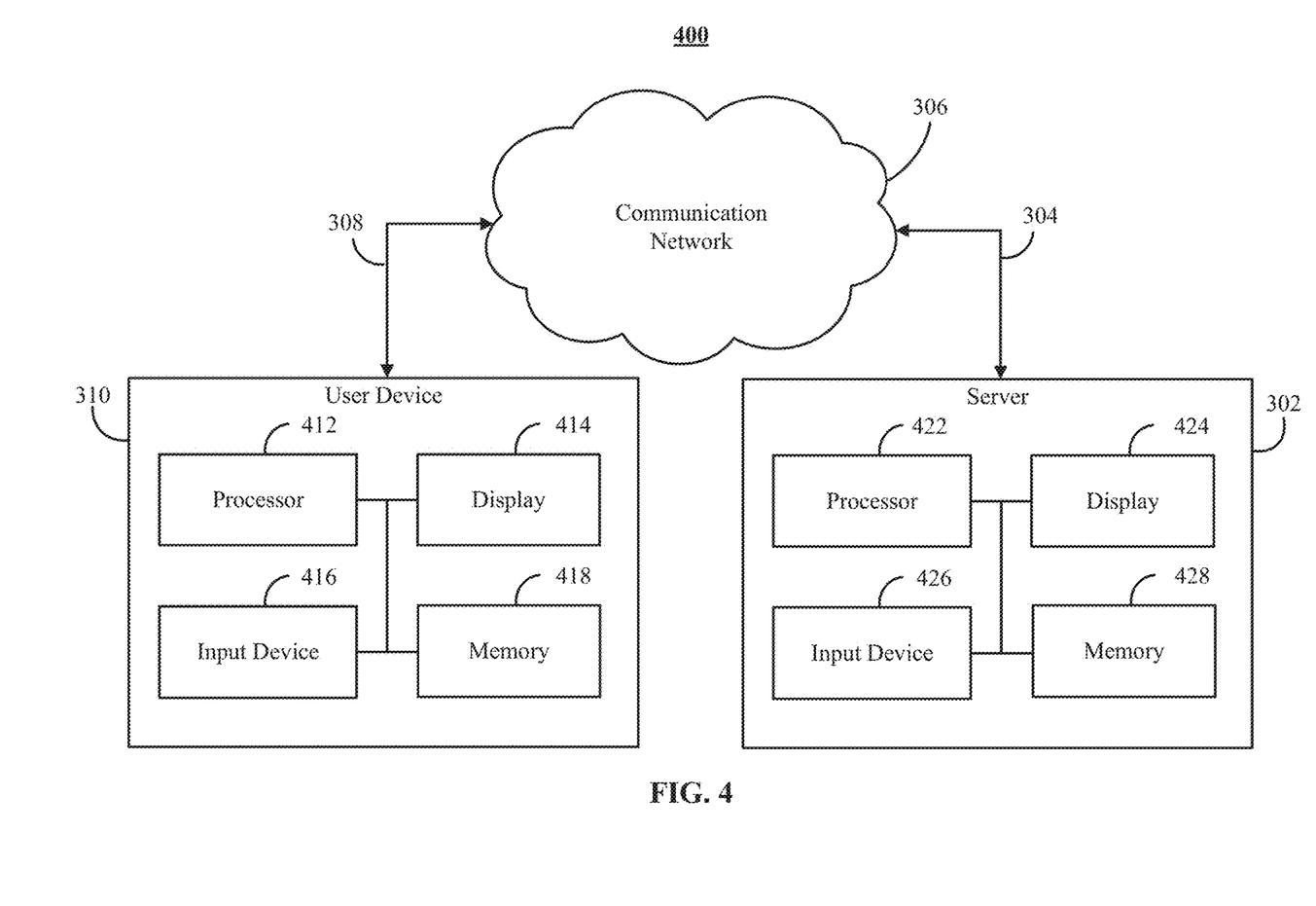
FIG. 4 shows an example of hardware that can be used to implement one of a computing device and a server depicted in FIG. 3 in accordance with some embodiments of the disclosed subject matter.

FIG. 4 shows an example 400 of hardware that can be used to implement one or more of user devices 310, and servers 302 depicted in FIG. 3 in accordance with some embodiments of the disclosed subject matter. Referring to FIG. 4, user device 310 can include a hardware processor 412, a display 414, an input device 416, and memory 418, which can be interconnected. In some embodiments, memory 418 can include a storage device (such as a non-transitory computer-readable medium) for storing a computer program for controlling hardware processor 412.

Hardware processor 412 can use the computer program to execute the mechanisms described herein for executing a mobile web browsing application to access mobile webpages, downloading and/or installing mobile software applications such as those available from an online marketplace, executing mobile software applications which present in-application advertisements, transmit advertisement requests from an advertisement tag on a website in response to a user accessing the website using a mobile device, transmit advertisement requests from an advertisement tag running in an advertisement SDK loaded in a mobile software application, sending and receiving data through communications link 108, and/or for performing any other suitable task associated with the mechanisms described herein. In some embodiments, hardware processor 412 can send and receive data through communications link 108 or any other communication links using, for example, a transmitter, a receiver, a transmitter/receiver, a transceiver, or any other suitable communication device. Display 414 can include a touchscreen, a flat panel display, a cathode ray tube display, a projector, a speaker or speakers, and/or any other suitable display and/or presentation devices. Input device 416 can be a computer keyboard, a computer mouse, a touchpad, a voice recognition circuit, a touchscreen, and/or any other suitable input device.

Server 302 can include a hardware processor 422, a display 424, an input device 426, and memory 428, which can be interconnected. In some embodiments, memory 428 can include a storage device (such as a non-transitory computer-readable medium) for storing data received through communications link 304 or through other links.

The storage device can further include a server program for controlling hardware processor 422. In some embodiments, memory 428 can include information stored as a result of user activity (e.g., user instructions to specify one or more advertising management techniques for particular advertising placements, etc.), and hardware processor 422 can receive information about advertising placements from user devices 310, (e.g., as described above in connection with process 200 of FIG. 2). In some embodiments, the server program can cause hardware processor 422 to, for example, execute one or more portions of process 200 as described above in connection with FIG. 2.

In a more particular example, hardware processor 422 can use the computer program to execute the mechanisms described herein for receiving a request for advertisement content from an advertisement tag on a website in response to a user accessing the website using a mobile device, determining whether the advertisement tag is running inside a mobile software application using one or more mobile environment detection techniques, storing indications that the advertisement tag is being executing within a mobile software application or a mobile web browsing application, determining which advertisement software development kit the advertisement tag is running in using one or more mobile environment detection techniques, storing an indication that associates the determined advertisement software development kit with the advertisement tag, sending and receiving data through communications link 108, and/or for performing any other suitable task associated with the mechanisms described herein.

Hardware processor 422 can use the server program to communicate with user devices 310 as well as provide access to and/or copies of the mechanisms described herein. It should also be noted that data received through communications link 304 or any other communications links can be received from any suitable source. In some embodiments, hardware processor 422 can send and receive data through communications link 104 or any other communications links using, for example, a transmitter, a receiver, a transmitter/receiver, a transceiver, or any other suitable communication device. In some embodiments, hardware processor 422 can receive commands and/or values transmitted by one or more user devices 310 and/or one or more users of server 302. Display 424 can include a touchscreen, a flat panel display, a cathode ray tube display, a projector, a speaker or speakers, and/or any other suitable display and/or presentation devices. Input device 426 can be a computer keyboard, a computer mouse, a touchpad, a voice recognition circuit, a touchscreen, and/or any other suitable input device.

In some embodiments, server 302 can be implemented in one server or can be distributed as any suitable number of servers. For example, multiple servers 302 can be implemented in various locations to increase reliability and/or increase the speed at which the server can communicate with user devices 310. Additionally or alternatively, as described above in connection with FIG. 3, multiple servers 302 can be implemented to perform different tasks associated with the mechanisms described herein.

It should be understood that the mechanisms described herein can, in some embodiments, include server-side software, server-side hardware, client-side software, client-side hardware, or any suitable combination thereof. For example, the mechanisms described herein can encompass a computer program written in a programming language recognizable by server 102 and/or by user device 110 (e.g., a program written in a programming language, such as, Java, C, Objective-C, C++, C#, JavaScript, Visual Basic, or any other suitable approaches). As another example, the mechanisms described herein can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the process of FIG. 2 can be executed or performed in any order or sequence not limited to the order and sequence shown and described in the figures. Also, some of the above steps of the process of FIG. 2 can be executed or performed substantially simultaneously where appropriate or in parallel to reduce latency and processing times. It should also be noted that, as used herein, the term mechanism can encompass hardware, software, firmware, or any suitable combination thereof.

Accordingly, methods, systems, and media for dynamically detecting mobile environment information are provided.

Although the invention has been described and illustrated in the foregoing illustrative implementations, it is understood that the present disclosure has been made only by way of example, and that numerous changes in the details of implementation of the invention can be made without departing from the spirit and scope of the invention. Features of the disclosed implementations can be combined and rearranged in various ways.

What is claimed is:

1. A method for detecting mobile environment information for advertisement requests, the method comprising:
   receiving, using a hardware processor, a request for advertising content from an advertisement tag;
   applying, using the hardware processor, one or more JavaScript objects to return a URL of an advertisement web view, wherein the advertisement web view is generated by an advertisement software development kit to contain an advertisement responsive to the request;
   extracting, using the hardware processor, keywords from the URL of the advertisement web view;
   determining, using the hardware processor, whether the advertisement tag is running within one of a mobile application and a mobile web browsing application based on a comparison of the extracted keywords with known mobile application information;
   in response to determining that the advertisement tag is running within the mobile application, determining, using the hardware processor, the advertisement software development kit from a plurality of advertisement software development kits that the advertisement tag is running in by:
applying, using the hardware processor, a plurality of JavaScript objects that are made available by the advertisement software development kit to return properties of the advertisement software development kit; and
comparing, using the hardware processor, the returned properties with a database of known software development kit information;
transmitting, using the hardware processor, a first indication that associates the advertisement software development kit used within a mobile application environment with the advertisement tag, wherein the advertisement tag is supplemented with information associated with the mobile application environment and the advertisement software development kit used within the mobile application environment; and
in response to determining that the advertisement tag is running within the mobile web browsing application, transmitting, using the hardware processor, a second indication that the advertisement tag was received from the mobile web browsing application, wherein the advertisement tag is supplemented with information associated with the mobile web browsing application.

2. The method of claim 1, further comprising adjusting an advertisement budget for advertisements presented within mobile applications based on one of the transmitted first indication and the transmitted second indication.

3. The method of claim 1, wherein the determining the advertisement software development kit from the plurality of advertisement software development kits that the advertisement tag is running further comprises:
applying a JavaScript object that returns a string of a user agent header transmitted in the request to an advertisement server; and
comparing at least a portion of the string of the user agent header with values stored in a database of known software development kit information.

4. The method of claim 1, wherein the determining the advertisement software development kit from the plurality of advertisement software development kits that the advertisement tag is running further comprises:
identifying HTML elements that have been injected in the advertisement web view by the advertisement software development kit; and
comparing at least a portion of the identified HTML elements with document properties stored in a database of known software development kit information.

5. The method of claim 1, wherein the advertisement software development kit from a plurality of advertisement software development kits that the advertisement tag is running in is determined using a first technique that includes the application of the plurality of JavaScript objects that are made available by the advertisement software development kit to return properties of the advertisement software development kit and the comparison of the returned properties with the database of known software development kit information and wherein the method further comprises:
determining a confidence value associated with the first technique; and
determining whether to continue using the first technique for determining the advertisement software development kit by comparing the confidence value with a threshold confidence value.

6. The method of claim 1, further comprising:
extracting property information using the plurality of JavaScript objects;
transmitting a query that includes the extracted property information to a database of known software development kit information; and
receiving a response to the query that includes one or more software development kits that match the extracted property information.

7. A system for detecting mobile environment information for advertisement requests, the system comprising:
a memory; and
a hardware processor that, when executing computer executable instructions stored in the memory, is configured to:
receive a request for advertising content from an advertisement tag;
apply one or more JavaScript objects to return a URL of an advertisement web view, wherein the advertisement web view is generated by an advertisement software development kit to contain an advertisement responsive to the request;
extract keywords from the URL of the advertisement web view;
determine whether the advertisement tag is running within one of a mobile application and a mobile web browsing application based on a comparison of the extracted keywords with known mobile application information;
in response to determining that the advertisement tag is running within the mobile application, determine the advertisement software development kit from a plurality of advertisement software development kits that the advertisement tag is running in by:
applying a plurality of JavaScript objects that are made available by the advertisement software development kit to return properties of the advertisement software development kit; and
comparing the returned properties with a database of known software development kit information;
transmit a first indication that associates the advertisement software development kit used within a mobile application environment with the advertisement tag, wherein the advertisement tag is supplemented with information associated with the mobile application environment and the advertisement software development kit used within the mobile application environment; and
in response to determining that the advertisement tag is running within the mobile web browsing application, transmit a second indication that the advertisement tag was received from the mobile web browsing application, wherein the advertisement tag is supplemented with information associated with the mobile web browsing application.

8. The system of claim 7, wherein the hardware processor is further configured to adjust an advertisement budget for advertisements presented within mobile applications based on one of the transmitted first indication and the transmitted second indication.

9. The system of claim 7, wherein the hardware processor is further configured to:
apply a JavaScript object that returns a string of a user agent header transmitted in the request to an advertisement server; and compare at least a portion of the string of the user agent header with values stored in a database of known software development kit information.

10. The system of claim 7, wherein the hardware processor is further configured to:
identify HTML elements that have been injected in the advertisement web view by the advertisement software development kit; and
compare at least a portion of the identified HTML elements with document properties stored in a database of known software development kit information.

11. The system of claim 7, wherein the advertisement software development kit from a plurality of advertisement software development kits that the advertisement tag is running in is determined using a first technique that includes the application of the plurality of JavaScript objects that are made available by the advertisement software development kit to return properties of the advertisement software development kit and the comparison of the returned properties with the database of known software development kit information and wherein the hardware processor is further configured to:
determine a confidence value associated with the first technique; and
determine whether to continue using the first technique for determining the advertisement software development kit by comparing the confidence value with a threshold confidence value.

12. The system of claim 7, wherein the hardware processor is further configured to:
extract property information using the plurality of JavaScript objects;
transmit a query that includes the extracted property information to a database of known software development kit information; and
receive a response to the query that includes one or more software development kits that match the extracted property information.

13. A non-transitory computer-readable medium containing computer-executable instructions that, when executed by a hardware processor, cause the hardware processor to perform a method for detecting mobile environment information for advertisement requests, the method comprising:
receiving a request for advertising content from an advertisement tag;
applying one or more JavaScript objects to return a URL of an advertisement web view, wherein the advertisement web view is generated by an advertisement software development kit to contain an advertisement responsive to the request;
extracting keywords from the URL of the advertisement web view;
determining whether the advertisement tag is running within one of a mobile application and a mobile web browsing application based on a comparison of the extracted keywords with known mobile application information;
in response to determining that the advertisement tag is running within the mobile application, determining the advertisement software development kit from a plurality of advertisement software development kits that the advertisement tag is running in by:
applying a plurality of JavaScript objects that are made available by the advertisement software development kit to return properties of the advertisement software development kit; and
comparing the returned properties with a database of known software development kit information;
transmitting a first indication that associates the advertisement software development kit used within a mobile application environment with the advertisement tag, wherein the advertisement tag is supplemented with information associated with the mobile application environment and the advertisement software development kit used within the mobile application environment; and
in response to determining that the advertisement tag is running within the mobile web browsing application, transmitting a second indication that the advertisement tag was received from a mobile web browsing application, wherein the advertisement tag is supplemented with information associated with the mobile web browsing application.

14. The non-transitory computer-readable medium of claim 13, wherein the method further comprises adjusting an advertisement budget for advertisements presented within mobile applications based on one of the transmitted first indication and the transmitted second indication.

15. The non-transitory computer-readable medium of claim 13, wherein the method further comprises:
applying a JavaScript object that returns a string of a user agent header transmitted in the request to an advertisement server; and
comparing at least a portion of the string of the user agent header with values stored in a database of known software development kit information.

16. The non-transitory computer-readable medium of claim 13, wherein the method further comprises:
identifying HTML elements that have been injected in the advertisement web view by the advertisement software development kit; and
comparing at least a portion of the identified HTML elements with document properties stored in a database of known software development kit information.

17. The non-transitory computer-readable medium of claim 13, wherein the advertisement software development kit from a plurality of advertisement software development kits that the advertisement tag is running in is determined using a first technique that includes the application of the plurality of JavaScript objects that are made available by the advertisement software development kit to return properties of the advertisement software development kit and the comparison of the returned properties with the database of known software development kit information and wherein the method further comprises:
determining a confidence value associated with the first technique; and
determining whether to continue using the first technique for determining the advertisement software development kit by comparing the confidence value with a threshold confidence value.

18. The non-transitory computer-readable medium of claim 13, wherein the method further comprises:
extracting property information using the plurality of JavaScript objects;
transmitting a query that includes the extracted property information to a database of known software development kit information; and
receiving a response to the query that includes one or more software development kits that match the extracted property information.

* * * * *